(12) United States Patent
Nagahama et al.

(10) Patent No.: US 8,889,787 B2
(45) Date of Patent: Nov. 18, 2014

(54) POLYURETHANE FILM AND PROCESSED FILM PRODUCED USING SAME

(75) Inventors: Sadamu Nagahama, Osaka (JP); Hiroki Tanaka, Osaka (JP); Mitsuru Kitada, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/235,721

(22) PCT Filed: Jun. 29, 2012

(86) PCT No.: PCT/JP2012/066689
§ 371 (c)(1),
(2), (4) Date: Jan. 28, 2014

(87) PCT Pub. No.: WO2013/018478
PCT Pub. Date: Feb. 7, 2013

(65) Prior Publication Data
US 2014/0163164 A1 Jun. 12, 2014

(30) Foreign Application Priority Data

Jul. 29, 2011 (JP) ................................. 2011-166785

(51) Int. Cl.
| | | |
|---|---|---|
| *A41D 19/00* | (2006.01) | |
| *A61F 5/44* | (2006.01) | |
| *A61F 6/04* | (2006.01) | |
| *C08G 18/00* | (2006.01) | |
| *C08G 18/08* | (2006.01) | |
| *C08G 18/28* | (2006.01) | |
| *C08G 18/32* | (2006.01) | |
| *C08G 18/70* | (2006.01) | |
| *C08L 75/00* | (2006.01) | |
| *F16L 11/00* | (2006.01) | |
| *C08G 18/42* | (2006.01) | |
| *C08G 18/12* | (2006.01) | |
| *C08J 5/18* | (2006.01) | |
| *C09D 175/04* | (2006.01) | |
| *C08G 18/66* | (2006.01) | |

(52) U.S. Cl.
CPC .......... *C09D 175/04* (2013.01); *C08J 2375/06* (2013.01); *C08G 18/4263* (2013.01); *C08G 18/12* (2013.01); *C08J 5/18* (2013.01); *C08G 18/4202* (2013.01); *C08G 18/664* (2013.01); *C08G 18/0823* (2013.01)
USPC ............... 524/590; 2/168; 128/844; 138/118; 524/589; 524/591; 524/839; 524/840; 528/44; 528/61; 528/65; 528/66; 528/71; 528/80; 528/84; 528/85; 604/347

(58) Field of Classification Search
CPC .......... A61F 6/04; A61L 31/00; A61L 31/04; A61L 31/06; A41D 19/0055; A41D 19/0062; B29C 41/00; B29C 41/003; B29C 41/14; B29D 7/00; B29D 7/01; B29D 22/00; B29D 24/00; B29D 99/0064; B29D 99/0067; B29K 2075/00; B29K 2075/02; B29K 2105/0064; B29L 2007/00; B29L 2007/008; B29L 2022/00; B29L 2022/02; B29L 2022/022; B29L 2023/00; B29L 2023/001; C08G 18/00; C08G 18/0819; C08G 18/0823; C08G 18/0828; C08G 18/12; C08G 18/4202; C08G 18/4236; C08G 18/4238; C08G 18/66; C08G 18/6633; C08G 18/6637; C08G 18/664; C08G 18/70; C08G 18/76; C08J 3/03; C08J 3/05; C08J 3/07; C08J 5/02; C08J 5/18; C08J 2375/00; C08J 2375/06; C08K 3/10; C08K 3/20; C08K 3/24; C08K 2003/16; C08K 2003/24; C08L 75/00; C08L 75/04; C08L 75/06; C08L 2203/16; C08L 2666/52; C08L 2666/54
USPC ............ 524/589, 590, 591, 839, 840; 528/44, 528/61, 65, 66, 71, 80, 84, 85
See application file for complete search history.

(56) References Cited

U.S. PATENT DOCUMENTS

| | | |
|---|---|---|
| 5,977,223 A | 11/1999 | Ryan et al. |
| 8,017,685 B2 | 9/2011 | Choi et al. |
| 2007/0249746 A1 | 10/2007 | Rische et al. |
| 2008/0009581 A1 | 1/2008 | Choi et al. |
| 2010/0004386 A1 | 1/2010 | Nishino |

FOREIGN PATENT DOCUMENTS

| | | |
|---|---|---|
| JP | 61-036314 A | 2/1986 |
| JP | 11-245243 A | 9/1999 |
| JP | 2001-011254 A | 1/2001 |
| JP | 2002256145 A | 9/2002 |
| JP | 2008506830 A | 3/2008 |
| JP | 2009533499 A | 9/2009 |
| JP | 2011-137052 A | 7/2011 |
| WO | 2008120688 A1 | 10/2008 |

OTHER PUBLICATIONS

International Search Report, mailed Sep. 25, 2012, which issued during the prosecution of International Application No. PCT/JP2012/066689, which corresponds to the present application.

*Primary Examiner* — Patrick Niland
(74) *Attorney, Agent, or Firm* — McDermott Will & Emery LLP

(57) ABSTRACT

A problem to be solved by the present invention is to provide a polyurethane film that offers both soft texture and high strength. The present invention relates to a polyurethane film obtained by solidifying a polyurethane (A) obtained by reacting a polyol (a1) including an aliphatic polyester polyol having an anionic group (a1-1), and a polyester polyol (a1-2) other than the aliphatic polyester polyol (a1-1) with a polyisocyanate (a2), using a metal salt, in which the polyurethane (A) has an aromatic structure in the range of 500 mmol/kg to 2,000 mmol/kg with respect to the entire polyurethane (A).

7 Claims, No Drawings

POLYURETHANE FILM AND PROCESSED FILM PRODUCED USING SAME

CROSS REFERENCE TO PRIOR APPLICATIONS

This application is a U.S. National Phase application under 35 U.S.C. §371 of International Application No. PCT/JP2012/066689, filed on Jun. 29, 2012 and claims benefit of priority to Japanese Patent Application No. 2011-166785, filed on Jul. 29, 2011. The International Application was published in Japanese on Feb. 7, 2013 as WO 2013/018478 A1 under PCT Article 21(2). The contents of the above applications are hereby incorporated by reference.

TECHNICAL FIELD

The present invention relates to a polyurethane film which can be used for the preparation of various processed films such as, for example, gloves, various tubes, and contraceptives.

BACKGROUND ART

Polyurethanes are used for the preparation of various processed films including, for example, gloves since it can form a cured product such as a film and a sheet, having relatively good softness.

Particularly, gloves, medical tubes, and the like are required to be highly soft and have superior soft texture as a high value-added product from the industry, and thus, development of polyurethanes which can satisfy such characteristics proceeds.

As a polyurethane film which can be used for the preparation of the gloves and the like, for example, a polyurethane film obtained by using an aqueous polyurethane emulsion composition including predetermined amounts of a polyisocyanate, a polyester polyol, an ionic compound, a chain extender, water, and a solvent has been known (see, for example, PTL 1).

However, since the polyurethane film obtained by using the aqueous polyurethane emulsion composition has a slightly hard texture, it has been not suitable in some cases for the use in the preparation of gloves or the like which are particularly required to have a soft texture.

In addition, the gloves or the like may be often required to have strength at such a high level that tear or the like is not caused by rubbing or the like, as well as a soft texture, according to the use purposes.

However, a polyurethane film having excellent softness has not been generally satisfactory in the required performance in terms of strength, and thus, it has caused, for example, tear when its surface is rubbed against other materials, the skin, or the like in some cases.

CITATION LIST

Patent Literature

[PTL 1] Japanese Unexamined Patent Application Publication (Translation of PCT Application) No. 2008-506830

SUMMARY OF INVENTION

Technical Problem

The present invention is made to solve the above-described problem and an object thereof is to provide a polyurethane film that offers both soft texture and high strength.

Solution to Problem

The present inventors have studied in order to solve the above-described problem, and as a result, they have found that a polyurethane film offering both remarkably excellent softness and high strength can be prepared by the combination of a polyurethane having a predetermined amount of aromatic structure used as a polyurethane and an aliphatic polyester polyol having an anionic group as a hydrophilic group used as a polyol used in the preparation of the polyurethane.

Specifically, the present invention relates to a polyurethane film obtained by solidifying a polyurethane (A) obtained by reacting a polyol (a1) including an aliphatic polyester polyol having an anionic group (a1-1), and a polyester polyol (a1-2) other than the aliphatic polyester polyol (a1-1) with a polyisocyanate (a2), using a metal salt, in which the polyurethane (A) has an aromatic structure in the range of 500 mmol/kg to 2,000 mmol/kg with respect to the entire polyurethane (A); and a processed film such as gloves, tube, and contraceptives, obtained by using the same.

Advantageous Effects of Invention

Since the polyurethane film of the present invention can offer both highly superior softness and high strength, it can be used, for example, for the preparation of various processed films including gloves, tubes such as medical tubes, and contraceptives such as condoms.

DESCRIPTION OF EMBODIMENTS

The polyurethane film of the present invention may be obtained by solidifying a urethane resin (A) having an aromatic structure in the range of 500 mmol/kg to 2,000 mmol/kg in the urethane resin obtained by reacting a polyol (a1) including an aliphatic polyester polyol having an anionic group (a1-1), and a polyester polyol (a1-2) other than the aliphatic polyester polyol (a1-1) with a polyisocyanate (a2), using a metal salt.

The polyurethane film of the present invention can be prepared by coating a polyurethane composition (X) including the polyurethane (A) on, for example, the surface of a release film, and then the coated product is immersed in a coagulant containing a metal salt, and then dried.

Examples of the method for coating the polyurethane composition (X) on a release film or the like include a knife coater method, a spray method, a curtain coater method, a flow coater method, a roll coater method, and a brush coating method. At the time of coating, the polyurethane composition (X) having a viscosity in the range of 50 mPa·s to 10,000 mPa·s is preferably used, and the polyurethane composition (X) having a viscosity of 1,000 mPa·s to 3,000 mPa·s is more preferably used. The viscosity of the polyurethane composition (X) can be suitably adjusted with the amount of a solvent to be used, use of an associative thickener, or the like.

As the coagulant for immersing a coated product of the polyurethane composition (X), for example, a metal salt or an aqueous solution thereof can be suitably used.

As the metal salt, for example, calcium nitrate, calcium chloride, zinc nitrate, zinc chloride, magnesium acetate, aluminum sulfate, sodium chloride, or the like can be used.

Moreover, the metal salt which has been dispersed, for example, in advance in a solvent is used as a coagulant. As the solvent in which the metal salt or acid can be dissolved, for example, water, methanol, ethanol, isopropanol, or the like can be used. The metal salt contained in the coagulant is preferably included in the amount in the range of 1% by mass to 50% by mass, and more preferably from 1% by mass to 20% by mass, with respect to the total amount of the coagulant, in that the metal salt and the like remaining on the surface are easily removed with water by washing the obtained polyurethane film.

In addition, in the present invention, as the coagulant, those containing formic acid, acetic acid, and the like known in the related art in addition to the metal salt may be used.

The duration for immersing the coated product in the coagulant containing the metal salt is preferably from about 1 minute to 10 minutes. Further, the temperature of the coagulant is preferably from about 5° C. to 60° C.

A polyurethane film solidified on the surface of the release film is formed by drying the coated product at a temperature of 50° C. to 150° C. for 1 minute to 1 hour after the immersion.

The polyurethane film obtained by the method above preferably has a thickness of about 0.5 μm to 300 μm from the viewpoint of holding good softness. Further, in the case of satisfying both of the softness and particularly excellent strength, the thickness is more preferably from approximately 40 μm to 200 μm.

From the viewpoint that the polyurethane film obtained by the method above has highly superior softness, the polyurethane film can be suitably used for the preparation of various processed films, including, for example, preparation of various gloves such as medical gloves, preparation of various tubes such as medical tubes, or preparation of contraceptives such as condoms.

Examples of the method for preparing a processed film having a predetermined shape, such as gloves and tubes, including the polyurethane film, include the following methods.

First, by immersing a hand mold, a tube mold, or the like in the coagulant containing the metal salt, and then drying, if necessary, the metal salt contained in the coagulant is attached to the surface of the hand mold or the like.

Then, by immersing the hand mold or the like in the polyurethane composition (X), and then washing the surface with water, followed by drying, a polyurethane film solidified on the surface of the hand mold and the like is formed.

Subsequently, gloves or the like including the polyurethane film, having a shape corresponding to the hand mold or the like, can be obtained by releasing the polyurethane film from a hand mold or the like. Also in the case of the preparation of the tube, the same method as above except for using a tube mold can be used for the preparation.

When immersed in the coagulant, the hand mold or the tube mold may be at ambient temperature (approximately 25° C.), but may also be warmed to about 30° C. to 70° C. Further, the coagulant may also be at ambient temperature (approximately 25° C.) similarly to the hand mold or the like, but in the case where the hand mold or the like is warmed, the coagulant may also be warmed to about 30° C. to 70° C.

In addition, on the hand mold or the tube mold, a glove-shaped material or a tubular material including knitted fabrics of nylon fibers or the like may be mounted in advance.

Specifically, first, a hand mold or the like on which a glove-shaped material including knitted fabrics is mounted is immersed in a coagulant containing a metal salt, and then dried, if necessary, to impregnate the coagulant in the glove-shaped material.

Then, the hand mold or the like is immersed in the polyurethane composition (X), and then the surface thereof is washed with water and dried to form a glove or the like including the polyurethane film solidified on the surface of the glove-shaped material or the like, and the gloves or the like are released from the hand mold and the glove-shaped material or the like, thereby obtaining gloves or the like including the polyurethane film having a shape corresponding to the hand mold or the like. In the case of the preparation of the tube, by the same method as above except that the tube mold and the tubular material including knitted fabrics of nylon fibers or the like are used, the tube can be prepared.

The knitted fabrics are not limited to those formed of the nylon fibers, and any of those formed of polyester fibers, aramid fibers, cotton, or the like may be used. Further, instead of the knitted fabrics, woven fabrics including the fibers may also be used. In addition, instead of the knitted fabrics, a glove-shaped material or a tubular material, which is formed of resin materials such as vinyl chloride, natural rubber, and synthetic rubber, may also be used.

As the polyurethane composition (X) used for the preparation of a polyurethane film or molded products such as gloves formed of the polyurethane film, those having the polyurethane (A) dissolved or dispersed in a solvent are preferably used from the viewpoint of improvement of handling properties or coating workability. As the solvent, an aqueous medium or an organic solvent can be used, and the aqueous medium is preferably used from the viewpoint of reduction of an environmental load.

Examples of the aqueous medium include water, an organic solvent miscible with water, and a mixture thereof. Examples of the organic solvent miscible with water include alcohols such as methanol, ethanol, n-propanol, and isopropanol; ketones such as acetone and methyl ethyl ketone; polyalkylene glycols such as ethylene glycol, diethylene glycol, and propylene glycol; alkyl ethers of polyalkylene glycol; and lactams such as N-methyl-2-pyrrolidone. In the present invention, water may be used alone, a mixture of water and an organic solvent miscible with water may be used, or the organic solvent miscible with water may also be used alone. From the viewpoint of safety and an environmental load, water alone or a mixture of water and an organic solvent miscible with water is preferable, and water alone is particularly preferable.

The polyurethane composition (X) preferably contains the polyurethane (A) in the amount in the range of 10% by mass to 50% by mass, and more preferably in the amount in the range of 20% by mass to 50% by mass, with respect to the total amount of the polyurethane composition (X), from the viewpoint of improving the workability for solidification using the metal salt.

As the polyurethane (A) contained in the polyurethane composition (X), for example, those obtained by reacting a polyol (a1) including an aliphatic polyester polyol having an anionic group (a1-1), and a polyester polyol (a1-2) other than the polyester polyol (a1-1), a polyisocyanate (a2), and if necessary, a chain extender (a3) can be used.

Moreover, as the polyurethane (A), those having an aromatic structure in the range of 500 mmol/kg to 2,000 mmol/kg with respect to the entire polyurethane (A) are used so as to offer both excellent softness and strength. Further, the aromatic structure represents an aromatic cyclic structure, which does not contain a functional group such as an alkyl group and an alkylene group bonded thereto. Specifically, in a case of a polyurethane obtained by using tolylene diisocyanate as the aromatic polyisocyanate, the aromatic structure represents a phenyl structure represented by the following chemical formula (I), which is introduced by the tolylene diisocyanate.

[Chem. 1]

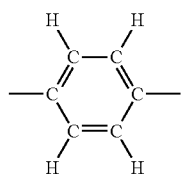

Chemical formula (I)

Here, in the case of using a polyurethane having no aromatic structure instead of the polyurethane (A), a polyurethane film having excellent strength cannot be obtained in some cases.

In addition, in the case of using a polyurethane having a proportion of an aromatic structure of 2,500 mmol/kg instead of the polyurethane (A), a polyurethane film having excellent softness cannot be obtained in some cases.

As the polyurethane (A), those having an aromatic structure in the range of 700 mmol/kg to 1,500 mmol/kg with respect to the entire polyurethane (A) are preferably used so as to offer both more excellent softness and strength.

Incidentally, even in the case of using a polyurethane obtained by using the aliphatic polyester polyol having an anionic group (a1-1), when the proportion of the aromatic structure contained in the polyurethane is not within the range above, a polyurethane film which offers both excellent softness and high strength cannot be obtained in some cases.

Examples of the aromatic structure include a phenyl structure, a diphenyl structure having two phenyl structures, and a naphthalene structure.

The aromatic structure is preferably a structure derived from the polyol (a1) or the polyisocyanate (a3) used for the preparation of the polyurethane (A), or the chain extender (a3), which can be used, if necessary, and more preferably a structure derived from the polyisocyanate (a3).

Furthermore, in the present invention, it is important that a predetermined amount of the aromatic structure be provided to the polyurethane (A), and the aliphatic polyester polyol having an anionic group (a1-1) be used as the polyol (a1) used for the preparation of the polyurethane (A).

Here, in the case of using an aromatic polyester polyol instead of the aliphatic polyester polyol (a1-1), even when the proportion of the aromatic structure contained in the obtained polyurethane is in the range of 500 mmol/kg to 2,000 mmol/kg, a polyurethane film having a hard texture is obtained, and a polyurethane film with a soft texture being at a level for the use in gloves or the like cannot be obtained in some cases.

Moreover, in the case of using a polyol containing 2,2'-dimethylol propionic acid and an aliphatic polyester polyol having no hydrophilic group such as an anionic group instead of the aliphatic polyester polyol (a1-1), the texture is hard in some cases, and thus, a polyurethane film having soft texture at such a level that the use in gloves or the like is allowed cannot be obtained in some cases, even though the proportion of the aromatic structure contained in the obtained polyurethane is in the range of 500 mmol/kg to 2,000 mmol/kg. That is, in order to solve the problems of the present invention, it is essential to use those in which an anionic group as a hydrophilic group is introduced into the structure of an aliphatic polyester polyol.

Moreover, in the present invention, it is important to use an aliphatic polyester polyol (a1-1), which is neither a polyether polyol nor a polycarbonate polyol. In the case of using a polyether polyol instead of the aliphatic polyester polyol (a1-1), reduction of the strength, such as occurrence of tear of a polyurethane film by the effect of friction, may occur in some cases. On the other hand, in the case of using a polycarbonate polyol instead of the aliphatic polyester polyol (a1-1), good strength can be provided, but remarkable reduction of softness may occur in some cases.

Furthermore, as the aliphatic polyester polyol (a1-1), those having an acid value of 40 to 75 are preferably used from the viewpoint of providing good water dispersibility of the polyurethane (A) in an aqueous medium, while not interfering with excellent softness and high strength, in particular, abrasion resistance.

Incidentally, as the aliphatic polyester polyol (a1-1), those having a hydroxyl value of 35 to 230 are preferably used from the viewpoint of providing the polyurethane film with excellent strength.

Moreover, as the aliphatic polyester polyol (a1-1), those having an alkyl group in the side chain are preferably used to form a polyurethane film having better softness from the viewpoint of providing better softness for the polyurethane film. Specifically, a methyl group, an ethyl group, a propyl group, a butyl group, and the like can be used, and an alkyl group having 1 to 3 carbon atoms is preferably used. The alkyl group is preferably contained in the amount of 800 mmol/kg to 7,000 mmol/kg with respect to the entire aliphatic polyester polyol (a1-1).

Furthermore, as the anionic group contained in the aliphatic polyester polyol (a1-1), for example, a carboxyl group, a carboxylate group, a sulfonic acid group, a sulfonate group, or the like can be used, and among these, an anionic group of a carboxylate group or a sulfonate group, in which a part or all of the carboxyl groups or sulfonic acid groups are preferably neutralized with a basic compound such as potassium hydroxide, is preferably used so as to impart good dispersion stability.

As the basic compound that can be used in neutralization of the anionic groups, for example, organic amines such as ammonia, triethylamine, morpholine, monoethanolamine, and diethylethanolamine, metal hydroxides including sodium hydroxide, potassium hydroxide, and lithium hydroxide, or the like can be used. Among these, potassium hydroxide is preferably used from the viewpoint of providing excellent water dispersion stability.

As the aliphatic polyester polyol having an anionic group (a1-1), for example, those obtained by subjecting a polyol (a1-1-2) including a polyol (a1-1-1) having an anionic group and a polycarboxylic acid (a1-1-3) to an esterification reaction can be used.

As the polyol having an anionic group (a1-1-1), for example, 2,2'-dimethylolpropionic acid, 2,2'-dimethylolbutanoic acid, 2,2'-dimethylolbutyric acid, 2,2'-dimethylolvaleric acid, a neutralized product thereof, or the like can be used. Among these, 2,2'-dimethylolpropionic acid and 2,2'-dimethiolbutanoic acid are preferably used.

As the polyol (a1-1-2), other polyols, in addition to the polyol having the anionic group (a1-1-1), may also be used, if necessary. Specifically, other polyols can be used for the purpose of introducing an alkyl group to the side chain of the aliphatic polyester polyol (a1-1).

As the other polyols above, for example, 2,2-dimethyl-1,3-propanediol, 3-methyl-1,5-pentanediol, 2-butyl-1,3-propanediol, 2-methyl-1,3-propanediol, 2-butyl-2-methyl-1,3-propanediol, 2-butyl-2-ethyl-1,3-propanediol, 2-pentyl-2-ethyl-1,3-propanediol, 2,2-dibutyl-1,3-propanediol, 1,2-propylene glycol, dipropylene glycol, tripropylene glycol, 1,3-butanediol, 2,3-butanediol, 1,4-hexanediol, 1,2-butanediol, 2,5-hexanediol, 2-ethyl-1,3-hexanediol, 2-methyl-1,8- octanediol, or the like can be used. Among these, glycol having an alkyl group having 1 to 3 carbon atoms in the side chain is preferably used, and 2,2-dimethyl-1,3-propanediol is more preferably used.

As the aliphatic polyester polyol (a1-1), those having an alkyl group derived from a polyol other than the polyol having an anionic group (a1-1-1) in the side chain are preferably used to further improve the soft texture. The alkyl group derived from the other polyol is preferably present in the side chain in the range of 500 mmol/kg to 5,000 mmol/kg, with respect to the entire aliphatic polyester polyol (a1-1).

Furthermore, as the other polyol, for example, ethylene glycol, 1,3-propylene glycol, 1,4-butanediol, 1,6-hexanediol, 1,8-octanediol, diethylene glycol, triethylene glycol, cyclohexane-1,4-diol, cyclohexane-1,4-dimethanol, or the like can be used, in addition to those described above.

As the polycarboxylic acid (a1-1-2) which can be reacted with the polyol (a1-1-2), for example, adipic acid, maleic acid, succinic acid, glutaric acid, pimelic acid, azelaic acid, itaconic acid, sebacic acid, chlorendic acid, 1,2,4-butanetricarboxylic acid, and a mixture thereof, and an esterified product thereof can be used. Among these, adipic acid is preferably used.

The aliphatic polyester polyol (a1-1) can be subjected to an esterification reaction by mixing the polyol (a1-1-2) including the polyol having the anionic group (a1-1-1) with the polycarboxylic acid (a1-1-3) by a method known in the related art. The same is true in the case of using the other polyols.

Furthermore, when used for the preparation of the urethane resin (A), it is important to use a combination of the aliphatic polyester polyol (a1-1) with the polyester polyol (a1-2) other than the aliphatic polyester polyol (a1-1).

Here, in the case of using the aliphatic polyester polyol (a1-1) alone as the polyol (a1), a polyurethane film having both soft texture and high strength cannot be obtained in some cases. Further, in the case of using the polyether polyol or the polycarbonate polyol in combination instead of the polyester polyol (a1-2), a polyurethane film having both soft texture and high strength cannot be obtained in some cases.

The polyester polyol (a1-2) is preferably used such that the mass ratio thereof to the aliphatic polyester polyol (a1-1), [(a1-1)/(a1-2)], be in the range of 20/80 to 80/20, and the mass ratio is preferably in the range of 35/65 to 65/35 to obtain a polyurethane film having soft texture.

Moreover, as the polyester polyol (a1-2), it is preferable to use those having an alkyl group in the side chain to offer both soft texture and high strength, similarly to the aliphatic polyester polyol (a1-1). Specifically, those having an alkyl group having 1 to 3 carbon atoms, such as a methyl group, an ethyl group, and a propyl group, in the range of 500 mmol/kg to 7,000 mmol/kg, are preferable.

In addition, as the polyester polyol (a1-2), those having a hydroxyl value of 35 to 230 are preferably used to offer both soft texture and high strength.

As the polyester polyol (a1-2), any one of an aliphatic polyester polyol other than the aliphatic polyester polyol (a1-1), and an aromatic polyester polyol can be used. Among these, an aliphatic polyester polyol is preferably used to obtain a polyurethane film having soft texture.

As the polyester polyol (a1-2), those obtained by subjecting the polyol (a1-2-1) and the polycarboxylic acid (a1-2-2) to an esterification reaction can be used.

As the polyol (a1-2-1), for example, ethylene glycol, 1,2-propylene glycol, 1,3-propylene glycol, 1,3-butanediol, 1,4-butanediol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, cyclohexane-1,4-diol, cyclohexane-1,4-dimethanol, glycerin, trimethylolpropane, trimethylolethane, hexanetriol, pentaerythritol, sorbitol, or the like can be used. Among these, 2,2-dimethyl-1,3-propanediol or 1,6-hexanediol is preferably used to form a polyurethane film that offers both soft texture and high strength.

Furthermore, as the polyol (a1-2-1), 2,2-dimethyl-1,3-propanediol, 3-methyl-1,5-pentanediol, 2-butyl-1,3-propanediol, 2-methyl-1,3-propanediol, 2-butyl-2-methyl-1,3-propanediol, 2-butyl-2-ethyl-1,3-propanediol, 2-pentyl-2-ethyl-1,3-propanediol, 2,2-dibutyl-1,3-propanediol, 1,2-propylene glycol, dipropylene glycol, tripropylene glycol, 1,3-butanediol, 1,2-butanediol, 2,3-butanediol, 1,4-hexanediol, 2,5-hexanediol, 2-ethyl-1,3-hexanediol, 2-methyl-1,8-octanediol, or the like can be used, from the viewpoint of introducing an alkyl group to the side chain of the polyester polyol (a1-2). Among these, a glycol having an alkyl group having 1 to 6 carbon atoms in the side chain is preferably used, and 2,2-dimethyl-1,3-propanediol is more preferably used.

As the polycarboxylic acid (a1-2-2), for example, succinic acid, adipic acid, glutaric acid, pimelic acid, suberic acid, azelaic acid, sebacic acid, phthalic acid, isophthalic acid, terephthalic acid, trimellitic acid, phthalic anhydride, tetrahydrophthalic anhydride, glutaric anhydride, maleic acid, maleic anhydride, hexahydroisophthalic acid, or the like can be used.

For the polyester polyol (a1-2), the polyol (a1-2-1) and the polycarboxylic acid (a1-2-2) are mixed and subjected to an esterification reaction by a method known in the related art.

Further, in order to prepare the urethane resin (A), various polyols can be used, if necessary, in addition to the aliphatic polyester polyol (a1-1) or the polyester polyol (a1-2). Specifically, polyols having relatively low molecular weights, such as ethylene glycol, 1,2-propylene glycol, 1,3-propylene glycol, 1,3-butanediol, 1,4-butanediol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, cyclohexane-1,4-diol, cyclohexane-1,4-dimethanol, glycerin, trimethylolpropane, trimethylolethane, hexanetriol, pentaerythritol, and sorbitol, can be used.

Incidentally, in addition to those described above, a polyether polyol or a polycarbonate polyol can be used within a range not interfering with the effect of the present invention.

As the polyisocyanate (a2) which can be reacted with the polyol (a1), for example, aromatic polyisocyanates such as phenylene diisocyanate, tolylene diisocyanate, diphenylmethane diisocyanate, naphthalene diisocyanate, polymethylenepolyphenylpolyisocyanate, and carbodiimidated diphenylmethanepolyisocyanate; and polyisocyanates having aliphatic or alicyclic structures, such as hexamethylene diisocyanate, lysine diisocyanate, cyclohexane diisocyanate, isophorone diisocyanate, dicyclohexylmethane diisocyanate, xylylene diisocyanate, tetramethylxylene diisocyanate, dimer acid diisocyanate, and norborene diisocyanate can be used alone or in combination of two or more kinds thereof. Among these, it is preferable to use an aromatic polyisocyanate to prepare the polyurethane (A) having a predetermined amount of aromatic structures, and as a result, prepare a polyurethane film having high strength while not impairing the soft texture, and it is particularly preferable to use tolylene diisocyanate.

The amount of the aromatic polyisocyanate to be used is preferably in the range of 10% by mass to 30% by mass with respect to the total amount of the raw materials which can be used for the preparation of the polyurethane (A) (for example, with respect to the total mass of the polyol (a1), the polyisocyanate (a2), and the chain extender (a3)) to prepare a polyurethane (A) including a predetermined amount of aromatic structure.

The polyurethane (A) used in the present invention can be prepared by, for example, mixing the polyol (a1) and the polyisocyanate (a2) in the absence of a solvent or in the presence of an organic solvent, and reacting them at 50° C. to 100° C. for about 3 hours to 10 hours.

For the reaction of the polyol (a1) with the polyisocyanate (a2), the equivalent ratio of the hydroxyl groups contained in the polyol (a1) to the isocyanate groups contained in the polyisocyanate (a2) [isocyanate groups/hydroxyl groups] is preferably in the range of 0.5 to 3.5, and more preferably 0.9 to 2.5.

As the organic solvent which can be used for the preparation of the polyurethane (A), for example, ketones such as acetone and methyl ethyl ketone; ethers such as tetrahydrofuran and dioxane; acetic esters such as ethyl acetate and butyl acetate; nitriles such as acetonitrile; amides such as dimethylformamide and N-methylpyrrolidone can be used alone or in combination of two or more kinds thereof.

When the polyurethane (A) is prepared, the chain extender (a3) can be used, if necessary. Specifically, a urethane resin having a urea bond, with a relatively high molecular weight, can be prepared by mixing the polyol (a1) and the polyisocyanate (a2) in the absence of a solvent or in the presence of an organic solvent, and reacting them at 50° C. to 100° C. for about 3 hours to 10 hours to prepare a urethane prepolymer having an isocyanate group at the end of the molecule, and then reacting the urethane prepolymer with the chain extender (a3).

As the polyurethane (A), those having urea bonds in the range of 200 mmol/kg to 800 mmol/kg are preferably used, and those having urea bonds in the range of 400 mmol/kg to 700 mmol/kg are more preferably used, from the viewpoint of imparting highly superior strength while not impairing the soft texture of the polyurethane film.

As the chain extender (a3), for example, polyamines, other compounds, or the like can be used.

As the polyamine, for example, diamines such as ethylene diamine, 1,2-propane diamine, 1,6-hexamethylene diamine, piperazine, 2,5-dimethylpiperazine, isophorone diamine, 4,4'-dicyclohexylmethane diamine, 3,3'-dimethyl-4,4'-dicyclohexylmethane diamine, 1,4-cyclohexane diamine; diamines having one primary amino group and one secondary amino group, such as N-hydroxymethylaminoethylamine, N-hydroxyethylaminoethylamine, N-hydroxypropylaminopropylamine, N-ethylaminoethylamine, and N-methylaminopropylamine; polyamines such as diethylenetriamine, dipropylenetriamine, and triethylenetetramine; hydrazines such as hydrazine, N,N'-dimethylhydrazine, and 1,6-hexamethylenebishydrazine; dihydrazides such as succinic acid dihydrazide, adipic acid dihydrazide, glutaric acid dihydrazide, sebacic acid dihydrazide, and isophthalic acid dihydrazide; and semicarbazides such as β-semicarbazide propionic acid hydrazide, 3-semicarbazidepropylcarbazic ester, and semicarbazide-3-semicarbazide methyl-3,5,5-trimethylcyclohexane can be used.

As the other compounds, for example, glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; bisphenol A, 4,4'-dihydroxydiphenyl, 4,4'-dihydroxydiphenylether, water, or the like can be used.

The chain extender (a3) is preferably used in the range of 1% by mass to 10% by mass with respect to the total amount of the raw materials used for the preparation of the urethane resin (A), from the viewpoint of imparting high strength while not impairing soft texture by introducing a urea bond to the polyurethane film.

The polyurethane (A) obtained by the method above preferably has a weight average molecular weight of 30,000 to 500,000.

As the polyurethane composition (X) used for the preparation of the polyurethane film of the present invention, those including the polyurethane (A) and a solvent as described above are preferably used, and as the solvent, an aqueous medium is preferably used.

The polyurethane composition including the polyurethane (A) and the aqueous medium as described above can be prepared by, for example, reacting a polyol (a1) including an aliphatic polyester polyol having an anionic group (a1-1) and a polyester polyol (a1-2) other than the aliphatic polyester polyol (a1-1), a polyisocyanate (a2), and if necessary, a chain extender (a3) in the absence of a solvent or in the presence of an organic solvent to prepare a polyurethane (A), then neutralizing a carboxyl group and the like in the polyurethane (A), if necessary, then supplying an aqueous medium, and dispersing the polyurethane (A) in the aqueous medium.

For example, for the chain extender (a3), the polyurethane (A) is stably dispersed in the aqueous medium and then the chain extender (a3) is supplied to perform the reaction, or the chain extender (a3) is supplied prior to mixing the polyurethane (A) with the aqueous medium to perform the reaction.

Further, when the polyurethane (A) and the aqueous medium are mixed, a machine such as a homogenizer may be used, if necessary.

In addition, when the polyurethane composition (X) is prepared, an emulsifier may be used from the viewpoint of improving the dispersion stability of the polyurethane (A) in an aqueous medium.

Examples of the emulsifiers include nonionic emulsifiers such as polyoxyethylene nonyl phenyl ether, polyoxyethylene lauryl ether, polyoxyethylene styryl phenyl ether, polyoxyethylene sorbitol tetraoleate, and polyoxyethylene polyoxypropylene copolymers; anionic emulsifiers such as fatty acid salts of sodium oleate, alkyl sulfate ester salts, alkylbenzenesulfonate, alkylsulfosuccinate, naphthalene sulfonate, polyoxyethylene alkylsulfate, sodium alkanesulfonate, and sodium alkyldiphenyl ether sulfonate; and cationic emulsifiers such as alkylamine salts, alkyltrimethyl ammonium salts, and alkyldimethylbenzylammonium salts.

Furthermore, the polyurethane composition (X) used in the present invention may contain various additives, if necessary. For example, additives such as an associative thickener, an antifoaming agent, a urethanation catalyst, a silane coupling agent, a filler, a thixotropic imparting agent, a tackifier, a wax, a heat stabilizer, a light stabilizer, an optical brightener, and a foaming agent, a thermoplastic resin, a thermosetting resin, a pigment, a dye, a conductivity imparting agent, an antistatic agent, a moisture permeability enhancing agent, a water repellent, an oil repellent, a hollow foam, a crystal water-containing compound, a flame retardant, a water-absorbing agent, a hygroscopic agent, a deodorant, an antifungal agent, a preservative, an anti-algae agent, a pigment dispersing agent, an anti-blocking agent, an anti-hydrolysis agent, a vulcanizing agent, a vulcanizing catalyst, or a surfactant may also be used.

The associative thickener can be suitably used to adjust the viscosity of the polyurethane composition (X) so as to facilitate the processing by solidification of salts, and for example, cellulose derivatives such as hydroxyethyl cellulose, methyl cellulose, and carboxymethyl cellulose, polyacrylates, polyvinylpyrrolidone, urethane-based thickener, polyether-based thickener, or the like may be used. Among these, from the viewpoint of good compatibility with the polyurethane (A), it is preferable to use a urethane-based thickener. The associative thickener is preferably used in the amount in the range of 0.5% by mass to 5% by mass with respect to the total amount of the polyurethane (A).

As the antifoaming agent, for example, a silicone-based antifoaming agent, a mineral oil-based antifoaming agent, a polyglycolether-based antifoaming agent, a fatty acid ester-based antifoaming agent, a metal soap-based antifoaming agent, a fluorine-based antifoaming agent, or the like can be used.

Moreover, the polyurethane composition (X) used in the present invention is required to have different durability or softness depending on the purpose of use, and thus, it may contain, for example, a styrene-butadiene copolymer (SBR), a butadiene copolymer (BR), an isoprene copolymer (IR), an ethylene-propylene-diene copolymer (EPDM), a chloroprene polymer (CR), an acrylonitrile-butadiene copolymer (NBR), a butyl polymer (IIR), natural rubber (NR), or the like. Among these, it is more preferable to use an acrylonitrile-butadiene copolymer (NBR) to offer both superior softness and high strength.

As the acrylonitrile-butadiene copolymer, for example, those obtained by the polymerization of acrylonitrile, butadiene, and if necessary, other vinyl polymers can be used.

The polyurethane composition (X) can be used for the preparation of the polyurethane film of the present invention, having soft texture, or various processed films such as gloves, tubes, and contraceptives.

EXAMPLES

Hereinafter, the present invention will be described in detail with reference to Examples and Comparative Examples.

Preparation Example 1

Polyester Polyol Having Carboxyl Group (a1-1A)

To a 3.0 liter flask, 155.4 parts by mass of 1,6-hexanediol (molecular weight of 118), 137.0 parts by mass of neopentyl glycol (molecular weight of 104), and 423.9 parts by mass of adipic acid (molecular weight of 146) were added, and the mixture was molten at 120° C. Then, the mixture was warmed to 220° C. over 3 hours to 4 hours under stirring, kept at the same temperature for 5 hours, and then cooled to 150° C. Thereafter, 88.2 parts by mass of 2,2'-dimethylolpropionic acid (molecular weight of 134) was added thereto and the mixture was kept at 150° C. for 5 hours to 10 hours under stirring. Subsequently, 300.0 parts by mass of methyl ethyl ketone was added to the mixture to prepare a solution of a polyester polyol having a carboxyl group (a1-1A) in methyl ethyl ketone (acid value of 52.9, hydroxyl value of 62.3) having 70.0% by mass of a non-volatile component. Further, the acid value was calculated by titration with a 0.1 mol/L potassium hydroxide solution in ethanol, from the titer of the potassium oxide solution, using a potentiometric titration method, in accordance with "JIS K 2501-2003 Petroleum Products And Lubricants—Determination Of Neutralization Number". Further, the hydroxyl value was calculated by acetylating the hydroxyl groups contained in the polyester polyol (a1-1A) using an acetylating reagent, and then titrating the acetic acid produced by hydrolysis of the unreacted acetylating reagent by water with potassium hydroxide, in accordance with "JIS K 1557-1:2007". The following acid value and hydroxyl value of the polyester polyol were calculated by the same method as above.

Preparation Example 2

Polyester Polyol Having Carboxyl Group (a1-1B)

To a 3.0 liter flask, 153.5 parts by mass of 1,6-hexanediol (molecular weight of 118), 135.3 parts by mass of neopentyl glycol (molecular weight of 104), and 418.0 parts by mass of adipic acid (molecular weight of 146) were added, and the mixture was molten at 120° C. Then, the mixture was warmed to 220° C. over 3 hours to 4 hours under stirring, kept at the same temperature for 5 hours, and then cooled to 150° C. Thereafter, 96.3 parts by mass of 2,2'-dimethylolbutanoic acid (molecular weight of 148) was added thereto and the mixture was kept at 150° C. for 5 hours to 10 hours under stirring. Subsequently, 300.0 parts by mass of methyl ethyl ketone was added to the mixture to prepare a solution of a polyester polyol having a carboxyl group (a1-1B) in methyl ethyl ketone (acid value of 52.1, hydroxyl value of 62.1) having 70.0% by mass of a non-volatile component.

Preparation Example 3

Polyester Polyol Having Carboxyl Group (a1-1C)

To a 3.0 liter flask, 159.4 parts by mass of 1,6-hexanediol (molecular weight of 118), 121.5 parts by mass of 1,4-butanediol (molecular weight of 90), and 436.2 parts by mass of adipic acid (molecular weight of 146) were added, and the mixture was molten at 120° C. Then, the mixture was warmed to 220° C. over 3 hours to 4 hours under stirring, kept at the same temperature for 5 hours, and then cooled to 150° C. Thereafter, 90.5 parts by mass of 2,2'-dimethylolpropionic acid (molecular weight of 134) was added thereto and the mixture was kept at 150° C. for 5 hours to 10 hours under stirring. Subsequently, 300.0 parts by mass of methyl ethyl ketone was added to the mixture to prepare a solution of a polyester polyol having a carboxyl group (a1-1C) in methyl ethyl ketone (acid value of 54.1, hydroxyl value of 62.0) having 70.0% by mass of a non-volatile component.

Preparation Example 4

Polyester Polyol Having Carboxyl Group (a1-1D)

To a 3.0 liter flask, 183.5 parts by mass of 1,6-hexanediol (molecular weight of 118), 137.6 parts by mass of neopentyl glycol (molecular weight of 104), and 426.3 parts by mass of adipic acid (molecular weight of 146) were added, and the mixture was molten at 120° C. Then, the mixture was warmed to 220° C. over 3 hours to 4 hours under stirring, kept at the same temperature for 5 hours, and then cooled to 150° C. Thereafter, 57.6 parts by mass of 2,2'-dimethylolpropionic acid (molecular weight of 134) was added thereto and the mixture was kept at 150° C. for 5 hours to 10 hours under stirring. Subsequently, 300.0 parts by mass of methyl ethyl ketone was added to the mixture to prepare a solution of a polyester polyol having a carboxyl group (a1-1D) in methyl ethyl ketone (acid value of 34.4, hydroxyl value of 62.3) having 70.0% by mass of a non-volatile component.

Preparation Example 5

Polyester Polyol Having Carboxyl Group (a1-1E)

To a 3.0 liter flask, 134.6 parts by mass of 1,6-hexanediol (molecular weight of 118), 118.6 parts by mass of neopentyl glycol (molecular weight of 104), and 419.1 parts by mass of adipic acid (molecular weight of 146) were added, and the mixture was molten at 120° C. Then, the mixture was warmed to 220° C. over 3 hours to 4 hours under stirring, kept at the same temperature for 5 hours, and then cooled to 150° C. Thereafter, 131.0 parts by mass of 2,2'-dimethylolpropionic acid (molecular weight of 134) was added thereto and the mixture was kept at 150° C. for 5 hours to 10 hours under stirring. Subsequently, 300.0 parts by mass of methyl ethyl ketone was added to the mixture to prepare a solution of a polyester polyol having a carboxyl group (a1-1E) in methyl ethyl ketone (acid value of 78.4, hydroxyl value of 62.4) having 70.0% by mass of a non-volatile component.

Preparation Example 6

Polyester Polyol Having Carboxyl Group (a1-1F)

To a 3.0 liter flask, 180.6 parts by mass of 1,6-hexanediol (molecular weight of 118), 135.4 parts by mass of neopentyl glycol (molecular weight of 104), and 434.4 parts by mass of adipic acid (molecular weight of 146) were added, and the mixture was molten at 120° C. Then, the mixture was warmed to 220° C. over 3 hours to 4 hours under stirring, kept at the same temperature for 5 hours, and then cooled to 150° C. Thereafter, 56.7 parts by mass of 2,2'-dimethylolpropionic acid (molecular weight of 134) was added thereto and the mixture was kept at 150° C. for 5 hours to 10 hours under stirring. Subsequently, 300.0 parts by mass of methyl ethyl ketone was added to the mixture to prepare a solution of a polyester polyol having a carboxyl group (a1-1F) in methyl ethyl ketone (acid value of 33.9, hydroxyl value of 44.9) having 70.0% by mass of a non-volatile component.

Preparation Example 7

Polyester Polyol (a1-2A)

To a 3.0 liter flask, 389.4 parts by mass of 1,6-hexanediol (molecular weight of 118), 147.1 parts by mass of neopentyl glycol (molecular weight of 104), 615.2 parts by mass of adipic acid (molecular weight of 146), and 0.06 parts by mass of tetraisopropoxytitanium as an esterification catalyst were added, and the mixture was molten at 120° C. Then, the mixture was warmed to 220° C. over 3 hours to 4 hours under stirring, kept at the same temperature for 10 hours, and then cooled to 100° C. to prepare a polyester polyol (a1-2A) (hydroxyl value 55.8).

Preparation Example 8

Polyester Polyol (a1-2B)

To a 3.0 liter flask, 396.8 parts by mass of 1,6-hexanediol (molecular weight of 118), 129.7 parts by mass of 1,4-butanediol (molecular weight of 90), 628.4 parts by mass of adipic acid (molecular weight of 146), and 0.06 parts by mass of tetraisopropoxytitanium as an esterification catalyst were added, and the mixture was molten at 120° C. Then, the mixture was warmed to 220° C. over 3 hours to 4 hours under stirring, kept at the same temperature for 10 hours, and then cooled to 100° C. to prepare a polyester polyol (a1-2B) (hydroxyl value 56.0).

Example 1

In a nitrogen-purged vessel equipped with a thermometer, a nitrogen gas inlet tube, and a stirrer, 198.3 parts by mass of a solution of the polyester polyol having a carboxyl group (a1-1A) in methyl ethyl ketone, 159.8 parts by mass of the polyester polyol (a1-2A), 19.1 parts by mass of 1,6-hexanediol, and 74.7 parts by mass of tolylene diisocyanate were reacted for 3 hours in the presence of 151.8 parts by mass of methyl ethyl ketone.

The reaction was completed at the time of point when NCO % under the provisions of the reactant is reached, thereby obtaining a solution of the polyurethane (A-1) in an organic solvent. Further, the NCO % is a percentage of the mass of the isocyanate groups contained in the polyisocyanate with respect to the total mass of the raw materials used for the preparation of the polyurethane.

Then, to the solution of the polyurethane (A-1) in an organic solvent were added 17.2 mass of triethylamine, 652.6 parts by mass of water, and 7.7 parts by mass of piperazine, and the mixture was stirred to obtain an aqueous dispersion of the polyurethane (A-1).

Subsequently, by aging the aqueous dispersion of the polyurethane (A-1) and removing the solvent therefrom, a polyurethane composition (I-1) (amount of the urea bonds in the polyurethane (A-1) of 445 mmol/kg) having a non-volatile component of 40% by mass was obtained. Further, the amount of the urea bonds was calculated, based on the amount of piperazine to be used.

100 parts by mass of the polyurethane composition (I-1) and 1.5 parts by mass of "Hydran Assister T10" (urethane-based associative thickener, manufactured by DIC) were mixed, and the viscosity of the mixture was adjusted to 1000 to 3000 mPa·s. Then, the mixture was coated on the surface of a polypropylene film at an ambient temperature (about 25° C.), which had been release-treated, at 150 g/cm² by a knife coater method.

The coated product was immersed in an aqueous solution of calcium nitrate adjusted to a concentration of 20% by mass, at an ambient temperature (about 25° C.) for 3 minutes, and then immersed in water for 18 hours.

Subsequently, the coated product was dried under an environment at 70° C. for 20 minutes, and further dried under an environment at 120° C. for 2 minutes to form a polyurethane film on the surface of the polypropylene film.

After drying as above, the polyurethane film was released from the surface of the polypropylene film to obtain a polyurethane film (I-2) having a thickness of 50 μm.

Furthermore, in the manufacture of a glove, a glove-shaped material including knitted fabrics formed of nylon fibers is first mounted on a hand mold, and immersed in an aqueous calcium nitrate solution at an ambient temperature (about 25° C.) adjusted to a concentration of 20% by mass for 15 seconds.

Then, the hand mold on which the glove-shaped material had been mounted was immersed in the polyurethane composition (I-1) for 3 minutes and then further immersed in water for 30 minutes.

Subsequently, the immersed product was dried under an environment at 70° C. for 20 minutes, and further dried under an environment at 120° C. for 30 minutes to form a polyurethane film having a shape of a hand mold (glove) on the surface of the glove-shaped material which had been mounted on the hand mold.

The polyurethane film having a shape of a hand mold (glove) was detached from the hand mold and the glove-shaped material to afford a glove (I-3).

Example 2

In a nitrogen-purged vessel equipped with a thermometer, a nitrogen gas inlet tube, and a stirrer, 201.0 parts by mass of a solution of the polyester polyol having a carboxyl group (a1-1B) in methyl ethyl ketone, 157.9 parts by mass of the polyester polyol (a1-2A), 19.1 parts by mass of 1,6-hexanediol, and 74.7 parts by mass of tolylene diisocyanate were reacted for 3 hours in the presence of 151.0 parts by mass of methyl ethyl ketone.

The reaction was completed at the time of point when NCO % under the provisions of the reactant is reached, thereby obtaining a solution of the polyurethane (A-2) in an organic solvent.

Then, to the solution of the polyurethane (A-2) in an organic solvent were added 17.2 mass of triethylamine, 652.6 parts by mass of water, and 7.7 parts by mass of piperazine, and the mixture was stirred to obtain an aqueous dispersion of the urethane resin (A-2).

Subsequently, by aging the aqueous dispersion of the polyurethane (A-2) and removing the solvent therefrom, a polyurethane composition (II-1) (amount of the urea bonds in the polyurethane (A-2) of 445 mmol/kg) having a non-volatile component of 40% by mass was obtained.

By the same method as in Example 1 except that the polyurethane composition (II-1) was used instead of the polyurethane composition (I-1), a polyurethane film (II-2) and a glove (II-3) were manufactured.

Example 3

In a nitrogen-purged vessel equipped with a thermometer, a nitrogen gas inlet tube, and a stirrer, 193.6 parts by mass of a solution of the polyester polyol having a carboxyl group (a1-1C) in methyl ethyl ketone, 163.0 parts by mass of the polyester polyol (a1-2A), 19.1 parts by mass of 1,6-hexanediol, and 74.7 parts by mass of tolylene diisocyanate were reacted for 3 hours in the presence of 153.2 parts by mass of methyl ethyl ketone.

The reaction was completed at the time of point when NCO % under the provisions of the reactant is reached, thereby obtaining a solution of the polyurethane (A-3) in an organic solvent.

Then, to the solution of the polyurethane (A-3) in an organic solvent were added 17.2 mass of triethylamine, 652.6 parts by mass of water, and 7.7 parts by mass of piperazine, and the mixture was stirred to obtain an aqueous dispersion of the polyurethane (A-3).

Subsequently, by aging the aqueous dispersion of the polyurethane (A-3) and removing the solvent therefrom, a polyurethane composition (III-1) (amount of the urea bonds in the polyurethane (A-3) of 445 mmol/kg) having a non-volatile component of 40% by mass was obtained.

By the same method as in Example 1 except that the polyurethane composition (III-1) was used instead of the polyurethane composition (I-1), a polyurethane film (III-2) and a glove (III-3) were manufactured.

Example 4

In a nitrogen-purged vessel equipped with a thermometer, a nitrogen gas inlet tube, and a stirrer, 201.1 parts by mass of a solution of the polyester polyol having a carboxyl group (a1-1A) in methyl ethyl ketone, 168.5 parts by mass of the polyester polyol (a1-2A), 19.8 parts by mass of 1,6-hexanediol, and 68.8 parts by mass of tolylene diisocyanate were reacted for 3 hours in the presence of 153.9 parts by mass of methyl ethyl ketone.

The reaction was completed at the time of point when NCO % under the provisions of the reactant is reached, thereby obtaining a solution of the polyurethane (A-4) in an organic solvent.

Then, to the solution of the polyurethane (A-4) in an organic solvent were added 17.4 mass of triethylamine, 652.6 parts by mass of water, and 2.3 parts by mass of piperazine, and the mixture was stirred to obtain an aqueous dispersion of the polyurethane (A-4).

Subsequently, by aging the aqueous dispersion of the polyurethane (A-4) and removing the solvent therefrom, a polyurethane composition (IV-1) (amount of the urea bonds in the polyurethane (A-4) of 132 mmol/kg) having a non-volatile component of 40% by mass was obtained.

By the same method as in Example 1 except that the polyurethane composition (IV-1) was used instead of the polyurethane composition (I-1), a polyurethane film (IV-2) and a glove (IV-3) were manufactured.

Example 5

In a nitrogen-purged vessel equipped with a thermometer, a nitrogen gas inlet tube, and a stirrer, 194.7 parts by mass of a solution of the polyester polyol having a carboxyl group (a1-1A) in methyl ethyl ketone, 146.9 parts by mass of the polyester polyol (a1-2A), 18.0 parts by mass of 1,6-hexanediol, and 84.0 parts by mass of tolylene diisocyanate were reacted for 3 hours in the presence of 149.0 parts by mass of methyl ethyl ketone.

The reaction was completed at the time of point when NCO % under the provisions of the reactant is reached, thereby obtaining a solution of the polyurethane (A-5) in an organic solvent.

Then, to the solution of the polyurethane (A-5) in an organic solvent were added 16.9 mass of triethylamine, 652.6 parts by mass of water, and 14.8 parts by mass of piperazine, and the mixture was stirred to obtain an aqueous dispersion of the polyurethane (A-5).

Subsequently, by aging the aqueous dispersion of the polyurethane (A-5) and removing the solvent therefrom, a polyurethane composition (V-1) (amount of the urea bonds in the polyurethane (A-5) of 859 mmol/kg) having a non-volatile component of 40% by mass was obtained.

By the same method as in Example 1 except that the polyurethane composition (V-1) was used instead of the polyurethane composition (I-1), a polyurethane film (V-2) and a glove (V-3) were manufactured.

Example 6

In a nitrogen-purged vessel equipped with a thermometer, a nitrogen gas inlet tube, and a stirrer, 282.0 parts by mass of a solution of the polyester polyol having a carboxyl group (a1-1A) in methyl ethyl ketone, 48.7 parts by mass of the polyester polyol (a1-2A), 37.4 parts by mass of 1,6-hexanediol, and 105.8 parts by mass of tolylene diisocyanate were reacted for 3 hours in the presence of 125.0 parts by mass of methyl ethyl ketone.

The reaction was completed at the time of point when NCO % under the provisions of the reactant is reached, thereby obtaining a solution of the polyurethane (A-6) in an organic solvent.

Then, to the solution of the polyurethane (A-6) in an organic solvent were added 24.5 mass of triethylamine, 652.6 parts by mass of water, and 10.9 parts by mass of piperazine, and the mixture was stirred to obtain an aqueous dispersion of the urethane resin (A-6).

Subsequently, by aging the aqueous dispersion of the polyurethane (A-6) and removing the solvent therefrom, a polyurethane composition (VI-1) having a non-volatile component of 40% by mass was obtained.

By the same method as in Example 1 except that the polyurethane composition (VI-1) (amount of the urea bonds in the polyurethane (A-6) of 630 mmol/kg) was used instead of the urethane resin composition (I-1), a polyurethane film (VI-2) and a glove (VI-3) were manufactured.

Example 7

In a nitrogen-purged vessel equipped with a thermometer, a nitrogen gas inlet tube, and a stirrer, 304.5 parts by mass of a solution of the polyester polyol having a carboxyl group (a1-1D) in methyl ethyl ketone, 86.0 parts by mass of the polyester polyol (a1-2A), 18.5 parts by mass of 1,6-hexanediol, and 74.7 parts by mass of tolylene diisocyanate were reacted for 3 hours in the presence of 119.9 parts by mass of methyl ethyl ketone.

The reaction was completed at the time of point when NCO % under the provisions of the reactant is reached, thereby obtaining a solution of the polyurethane (A-7) in an organic solvent.

Then, to the solution of the polyurethane (A-7) in an organic solvent were added 17.2 mass of triethylamine, 652.6 parts by mass of water, and 7.7 parts by mass of piperazine, and the mixture was stirred to obtain an aqueous dispersion of the polyurethane (A-7).

Subsequently, by aging the aqueous dispersion of the polyurethane (A-7) and removing the solvent therefrom, a polyurethane composition (VII-1) (amount of the urea bonds in the polyurethane (A-7) of 445 mmol/kg) having a non-volatile component of 40% by mass was obtained.

By the same method as in Example 1 except that the polyurethane composition (VII-1) was used instead of the polyurethane composition (I-1), a polyurethane film (VII-2) and a glove (VII-3) were manufactured.

Example 8

In a nitrogen-purged vessel equipped with a thermometer, a nitrogen gas inlet tube, and a stirrer, 133.7 parts by mass of a solution of the polyester polyol having a carboxyl group (a1-1E) in methyl ethyl ketone, 204.7 parts by mass of the polyesterpolyol (a1-2A), 19.4 parts by mass of 1,6-hexanediol, and 74.7 parts by mass of tolylene diisocyanate were reacted for 3 hours in the presence of 171.2 parts by mass of methyl ethyl ketone.

The reaction was completed at the time of point when NCO % under the provisions of the reactant is reached, thereby obtaining a solution of the polyurethane (A-8) in an organic solvent.

Then, to the solution of the polyurethane (A-8) in an organic solvent were added 17.2 mass of triethylamine, 652.6 parts by mass of water, and 7.7 parts by mass of piperazine, and the mixture was stirred to obtain an aqueous dispersion of the polyurethane (A-8).

Subsequently, by aging the aqueous dispersion of the polyurethane (A-8) and removing the solvent therefrom, a polyurethane composition (VIII-1) (amount of the urea bonds in the polyurethane (A-8) of 445 mmol/kg) having a non-volatile component of 40% by mass was obtained.

By the same method as in Example 1 except that the polyurethane composition (VIII-1) was used instead of the polyurethane composition (I-1), a polyurethane film (VIII-2) and a glove (VIII-3) were manufactured.

Comparative Example 1

In a nitrogen-purged vessel equipped with a thermometer, a nitrogen gas inlet tube, and a stirrer, 129.5 parts by mass of the polyester polyol (a1-2A), 129.0 parts by mass of the polyester polyol (a1-2B), 4.1 parts by mass of 1,6-hexanediol, 15.4 parts by mass of 2,2'-dimethylolpropionic acid, and 65.4 parts by mass of tolylene diisocyanate were reacted for 3 hours in the presence of 233.0 parts by mass of methyl ethyl ketone.

The reaction was completed at the time of point when NCO under the provisions of the reactant is reached, thereby obtaining a solution of the polyurethane (A'-1) in an organic solvent.

Then, to the solution of the polyurethane (A'-1) in an organic solvent were added 15.1 mass of triethylamine, 652.0 parts by mass of water, and 6.7 parts by mass of piperazine, and the mixture was stirred to obtain an aqueous dispersion of the polyurethane (A'-1).

Subsequently, by aging the aqueous dispersion of the polyurethane (A'-1) and removing the solvent therefrom, a polyurethane composition (I'-1) (amount of the urea bonds in the polyurethane (A'-1) of 445 mmol/kg) having a non-volatile component of 35% by mass was obtained.

By the same method as in Example 1 except that the polyurethane composition (I'-1) was used instead of the polyurethane composition (I-1), a polyurethane film (I'-2) and a glove (I'-3) were manufactured.

Comparative Example 2

In a nitrogen-purged vessel equipped with a thermometer, a nitrogen gas inlet tube, and a stirrer, 271.7 parts by mass of a solution of the polyester polyol having a carboxyl group (a1-1F) in methyl ethyl ketone, 173.6 parts by mass of the polyester polyol (a1-2A), and 33.9 parts by mass of tolylene diisocyanate were reacted for 3 hours in the presence of 132.7 parts by mass of methyl ethyl ketone.

The reaction was completed at the time of point when NCO % under the provisions of the reactant is reached, thereby obtaining a solution of the polyurethane (A'-2) in an organic solvent.

Then, to the solution of the polyurethane (A'-2) in an organic solvent were added 15.1 mass of triethylamine, 652.6 parts by mass of water, and 2.2 parts by mass of piperazine, and the mixture was stirred to obtain an aqueous dispersion of the polyurethane (A'-2).

Subsequently, by aging the aqueous dispersion of the polyurethane (A'-2) and removing the solvent therefrom, a polyurethane composition (II'-1) (amount of the urea bonds in the polyurethane (A'-2) of 130 mmol/kg) having a non-volatile component of 40% by mass was obtained.

By the same method as in Example 1 except that the polyurethane composition (II'-1) was used instead of the polyurethane composition (I-1), a polyurethane film (II'-2) and a glove (II'-3) were manufactured.

Comparative Example 3

In a nitrogen-purged vessel equipped with a thermometer, a nitrogen gas inlet tube, and a stirrer, 187.5 parts by mass of a solution of the polyester polyol having a carboxyl group (a1-1A) in methyl ethyl ketone, 66.3 parts by mass of the polyester polyol (a1-2A), and 140.5 parts by mass of tolylene diisocyanate were reacted for 3 hours in the presence of 143.5 parts by mass of methyl ethyl ketone.

The reaction was completed at the time of point when NCO % under the provisions of the reactant is reached, thereby obtaining a solution of the polyurethane (A'-3) in an organic solvent.

Then, to the solution of the polyurethane (A'-3) in an organic solvent were added 16.3 mass of triethylamine, 652.6 parts by mass of water, and 29.1 parts by mass of piperazine, and the mixture was stirred to obtain an aqueous dispersion of the polyurethane (A'-3).

Subsequently, by aging the aqueous dispersion of the polyurethane (A'-3) and removing the solvent therefrom, a polyurethane composition (III'-1) (amount of the urea bonds in the polyurethane (A'-3) of 1689.8 mmol/kg) having a non-volatile component of 40% by mass was obtained.

By the same method as in Example 1 except that the polyurethane composition (III'-1) was used instead of the polyurethane composition (I-1), a polyurethane film (III'-2) and a glove (III'-3) were manufactured.

Comparative Example 4

In a nitrogen-purged vessel equipped with a thermometer, a nitrogen gas inlet tube, and a stirrer, 198.5 parts by mass of a solution of the polyester polyol having a carboxyl group (a1-1A) in methyl ethyl ketone, 145.1 parts by mass of the polyester polyol (a1-2A), and 90.6 parts by mass of isophorone diisocyanate were reacted for 3 hours in the presence of 151.19 parts by mass of methyl ethyl ketone.

The reaction was completed at the time of point when NCO % under the provisions of the reactant is reached, thereby obtaining a solution of the polyurethane (A'-4) in an organic solvent.

Then, to the solution of the polyurethane (A'-4) in an organic solvent were added 17.2 mass of triethylamine, 652.6 parts by mass of water, and 7.3 parts by mass of piperazine, and the mixture was stirred to obtain an aqueous dispersion of the polyurethane (A'-4).

Subsequently, by aging the aqueous dispersion of the polyurethane (A'-4) and removing the solvent therefrom, a polyurethane composition (IV'-1) (amount of the urea bonds in the polyurethane (A'-4) of 422.9 mmol/kg) having a non-volatile component of 40% by mass was obtained.

By the same method as in Example 1 except that the polyurethane composition (III'-1) was used instead of the polyurethane composition (I-1), a polyurethane film (III'-2) and a glove (III'-3) were manufactured.

[Method for Evaluation of Softness]

The softness was evaluated, based on the 300% modulus of the polyurethane films obtained in Examples and Comparative Examples above. The 300% modulus of the polyurethane films obtained above was measured, using Autograph AG-I (manufactured by Shimadzu Corporation, tensile rate 300 mm/min). Based on the measured values obtained above and the evaluation criteria below, the softness of the polyurethane film was evaluated. Specifically, a lower measured value evaluated to indicate superior softness.

A: The 300% modulus was less than 15 MPa.
B: The 300% modulus was 15 MPa or more and less than 20 MPa.
C: The 300% modulus was 20 MPa or more and less than 25 MPa.
D: The 300% modulus was 25 MPa or more.

[Method for Evaluating Strength (Abrasion Resistance)]

The strength (abrasion resistance) was evaluated, using the gloves obtained in Examples and Comparative Examples above. Specifically, the strength of the palm portion of the gloves was measured, based on Test Standard EN388:2004 (Martindale abrasion machine; manufactured by Intec Products, Inc.). As a result of the test, a higher number of abrasion events until the palm portions of the gloves were broken was evaluated to indicate high strength.

A: The number of abrasion events was 3500 or more.
B: The number of abrasion events was 3000 or more and less than 3500.
C: The number of abrasion events was 2500 or more and less than 3000.
D: The number of abrasion events was less than 2500.

TABLE 1

|  | Example 1 | Example 2 | Example 3 | Example 4 | Example 5 |
|---|---|---|---|---|---|
| Polyurethane composition | I-1 | II-1 | III-1 | IV-1 | V-1 |
| Proportion of the aromatic structure (mmol/kg) | 1072 | 1072 | 1072 | 987 | 1205 |
| Softness of polyurethane film | A | A | B | A | B |
| Strength of glove (abrasion resistance) | A | A | A | B | A |

TABLE 2

|  | Example 6 | Example 7 | Example 8 |
|---|---|---|---|
| Polyurethane composition | VI-1 | VII-1 | VIII-1 |
| Proportion of the aromatic structure (mmol/kg) | 1518 | 1072 | 1072 |
| Softness of polyurethane film | B | A | B |
| Strength of glove (abrasion resistance) | B | B | A |

TABLE 3

|  | Comparative Example 1 | Comparative Example 2 | Comparative Example 3 | Comparative Example 4 |
|---|---|---|---|---|
| Urethane resin composition | I'-1 | II'-1 | III'-1 | IV'-1 |
| Proportion of the aromatic structure (mmol/kg) | 1072 | 487 | 2016 | 0 |
| Softness of polyurethane film | D | B | D | B |
| Strength of glove (abrasion resistance) | C | D | B | D |

The "proportion of the aromatic structure" in Tables 1 to 3 represents the amount of substance of aromatic structures, specifically phenyl groups, which are present in the polyurethane, with respect to the mass of the polyurethane.

The polyurethane films and the gloves obtained in Examples 1 and 2 were those each having excellent softness and strength capable of withstanding abrasion. The polyurethane films and the gloves obtained in Examples 3, 5, and 8 were those having good softness and excellent strength. Further, the polyurethane films and the gloves obtained in Examples 4 and 7 were those having highly superior softness and good strength. The polyurethane film and the glove obtained in Example 6 had good softness and good strength.

To the contrary, the polyurethane film and the glove in Comparative Example 1, obtained by not using the aliphatic polyester polyol having an anionic group had practically insufficient softness and strength. Further, the polyurethane films and the gloves in Comparative Examples 2 and 4 which had a proportion of the aromatic structure of less than 500 mmol/kg had good softness to some degrees, but did not have sufficient strength. In addition, the polyurethane film and the glove in Comparative Example 3, which had a proportion of the aromatic structure of more than 2000 mmol/kg, had good strength to some degrees, but did not have sufficient strength.

The invention claimed is:

1. A polyurethane film obtained by solidifying a polyurethane (A) in a coagulant containing a metal salt, wherein the polyurethane (A) is obtained by reacting a polyol (a1) with a polyisocyanate (a2), wherein the polyol (a1) includes an aliphatic polyester polyol having an anionic group (a1-1) and a polyester polyol (a1-2) other than the aliphatic polyester polyol (a1-1), and wherein the polyurethane (A) has an aromatic structure in the range of 500 mmol/kg to 2,000 mmol/kg with respect to the entire polyurethane (A).

2. The polyurethane film according to claim 1, wherein the polyester polyol (a1-2) is an aliphatic polyester polyol containing an alkyl group having 1 to 3 carbon atoms in a side chain, and the polyisocyanate (a2) is an aromatic polyisocyanate.

3. The polyurethane film according to claim 1, wherein the obtained film is a processed film having a predetermined shape.

4. The polyurethane film according to claim 1, wherein the obtained film is a processed film having a predetermined shape.

5. The polyurethane film according to claim 1, wherein the film is obtained by coating a polyurethane composition (X) including the polyurethane (A) on the surface of a release film, and then immersing the coated product in the coagulant containing a metal salt followed by drying the product.

6. The polyurethane film according to claim 3, wherein the processed film is a glove, a tube, or a contraceptive.

7. The polyurethane film according to claim 3, wherein the processed film is obtained by immersing a mold in the coagulant containing the metal salt, then drying the mold, if necessary, followed by immersing the mold in a polyurethane composition (X) including the polyurethane (A).

* * * * *